United States Patent
Zerod et al.

(10) Patent No.: US 7,617,045 B2
(45) Date of Patent: Nov. 10, 2009

(54) PROGRAMMABLE ROUTE SPECIFIC DYNAMIC TRAFFIC WARNING SYSTEM

(75) Inventors: Richard D. Zerod, Chelsea, MI (US);
Nazih K. Hijaouy, Plymouth, MI (US);
David S. Cheney, Wixom, MI (US);
Robert J. Burnham, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 562 days.

(21) Appl. No.: 11/580,168

(22) Filed: Oct. 12, 2006

(65) Prior Publication Data
US 2008/0091346 A1   Apr. 17, 2008

(51) Int. Cl.
*G01C 21/30* (2006.01)
*G08G 1/00* (2006.01)

(52) U.S. Cl. ................................. 701/210; 701/117
(58) Field of Classification Search ......... 701/200–202, 701/117–119; 340/988, 995.13
See application file for complete search history.

(56) References Cited

U.S. PATENT DOCUMENTS

| | | |
|---|---|---|
| 6,336,075 B1 | 1/2002 | Park et al. |
| 6,463,265 B1 | 10/2002 | Cohen et al. |
| 6,546,337 B2 | 4/2003 | Fish et al. |
| 6,741,932 B1 * | 5/2004 | Groth et al. ............. 701/210 |
| 6,856,902 B1 | 2/2005 | Mitchem |
| 6,865,475 B2 | 3/2005 | Willenbrock |
| 6,950,746 B2 * | 9/2005 | Yano et al. ............. 701/210 |
| 6,963,799 B2 | 11/2005 | Kita et al. |
| 7,026,958 B2 | 4/2006 | Wainfan et al. |
| 7,251,558 B1 * | 7/2007 | McGrath ................. 701/117 |
| 7,269,503 B2 * | 9/2007 | McGrath ................. 701/117 |
| 2002/0027512 A1 | 3/2002 | Horita et al. |
| 2002/0161518 A1 | 10/2002 | Petzold et al. |
| 2005/0065711 A1 | 3/2005 | Dahlgren et al. |
| 2005/0090974 A1 | 4/2005 | Hirose |
| 2005/0192727 A1 | 9/2005 | Shostak et al. |
| 2005/0259606 A1 | 11/2005 | Shutter et al. |
| 2006/0064237 A1 | 3/2006 | Mbekeani et al. |

FOREIGN PATENT DOCUMENTS

| | | |
|---|---|---|
| EP | 1 395 078 A2 | 3/2004 |
| JP | 2001-143190 | 5/2001 |
| JP | 2002-245593 | 8/2002 |

OTHER PUBLICATIONS

Kantronics The Talon UDC Data Radios, www.kantronics.com, p. 1-7.
Personaltechpipeline New Garmin GPS Avoids Traffic Jams, Plays MP3 Jams, www.personaltechpipeline.com, p. 1-4.
Pioneer sound.vision.soul, www.pioneerelectronics.com, p. 1-3.
TomTom PLUS Services, www.tomtom.com, p. 1-4.

* cited by examiner

*Primary Examiner*—Yonel Beaulieu
(74) *Attorney, Agent, or Firm*—Brinks Hofer Gilson & Lione

(57) ABSTRACT

A system and method for providing a user with traffic information. The system generally includes a processor, traffic and location antennas in communication with the processor, a traffic location table database in communication with the processor, and a memory unit in communication with the processor and having processor executable instructions. The method includes the steps of saving a set of locations, determining at least one area of interest, receiving the traffic message and outputting the traffic message to an output device if the traffic location is located within the at least one area of interest.

19 Claims, 4 Drawing Sheets

PROGRAMMABLE ROUTE SPECIFIC DYNAMIC TRAFFIC WARNING SYSTEM

BACKGROUND

1. Field of the Invention

The present invention generally relates to systems and methods for providing automobile traffic information to a driver of an automobile.

2. Description of the Known Technology

The number of automobiles found on roads has increased remarkably. Because of this increase and the difficulty and expense of providing additional roads to accommodate the increase of automobiles, the amount of automobile traffic has substantially increased. In order to avoid traffic congestion, drivers of automobiles have been provided traffic information in numerous ways. The most common way of providing traffic information to drivers is via audio broadcasts on AM/FM radio stations. Typically, radio stations broadcasting traffic information do so at designated intervals. For example, some radio stations may provide traffic information every fifteen minutes. Between the traffic information broadcasts, the radio station provides its standard programming. Other methods for receiving traffic information are available over the Satellite Digital Audio Radio Service (SDARS). Both XM and Sirius Satellite Radio have dedicated audio channels which provide traffic information for numerous major cities.

Although cost effective and simple to operate, each of these methods have several significant drawbacks. For AM/FM broadcasts, one drawback is that the driver must wait for the traffic information to be broadcasted. Because of this wait, the driver may not have sufficient advance notice to be able to adjust their route to avoid traffic. Another drawback is that the driver must continually monitor the radio station for the traffic information. If the driver changes radio stations or utilizes another audio based entertainment device, such as a compact disk player, the driver risks not receiving the traffic information. A further drawback is that the traffic information may not be relevant to the area in which the driver is traveling. Although the SDARS service providers offer dedicated traffic channels for select markets, similar drawbacks exist in that the driver must periodically re-tune to the same channel in order to obtain the latest traffic information, and the traffic information may not be relevant to the area in which the driver is traveling.

Another way of providing traffic information to the driver is via a vehicle navigation system. A vehicle navigation system may be configured to receive traffic information on the data channel from an AM, FM, or satellite digital audio radio services, such as the XM and Sirius satellite radio services. Because the vehicle navigation system will automatically monitor incoming data for relevant traffic information, there is no need for the driver to constantly monitor a radio broadcast. However, vehicle navigation systems are costly and are complex to operate, preventing many drivers from considering this option.

Therefore, there is a need for a simple to operate, cost effective system and method for providing traffic information to a driver without requiring the driver to constantly monitor radio broadcasts.

SUMMARY

In satisfying the above need, as well as overcoming the enumerated drawbacks and other limitations of the related art, the present invention provides a system and method for providing a driver with traffic information. The system is generally to be installed within an automobile and includes a processor, traffic and location antennas in communication with the processor, a traffic location table in communication with the processor, and a memory unit in communication with the processor and having processor executable instructions.

The traffic antenna is configured to transmit a received traffic message to the processor. The traffic message would minimally include traffic location and traffic incident data. In order to identify the location of the system, the location antenna is configured to transmit location data to the processor. Finally, the traffic location table minimally includes a set of traffic location codes and their corresponding latitude and longitude, a description of each traffic location code, and a direction indicator for each traffic location code.

The memory unit includes instructions executable by the processor that configure the processor to determine at least one area of interest, to receive the traffic message and to communicate the traffic message to an output device, the latter being done if the traffic message specifies a location that is located within the area of interest.

Further objects, features and advantages of this invention will become readily apparent to persons skilled in the art after a review of the following description, with reference to the drawings and claims that are appended to and form a part of this specification.

DETAILED DESCRIPTION

Figure 1:
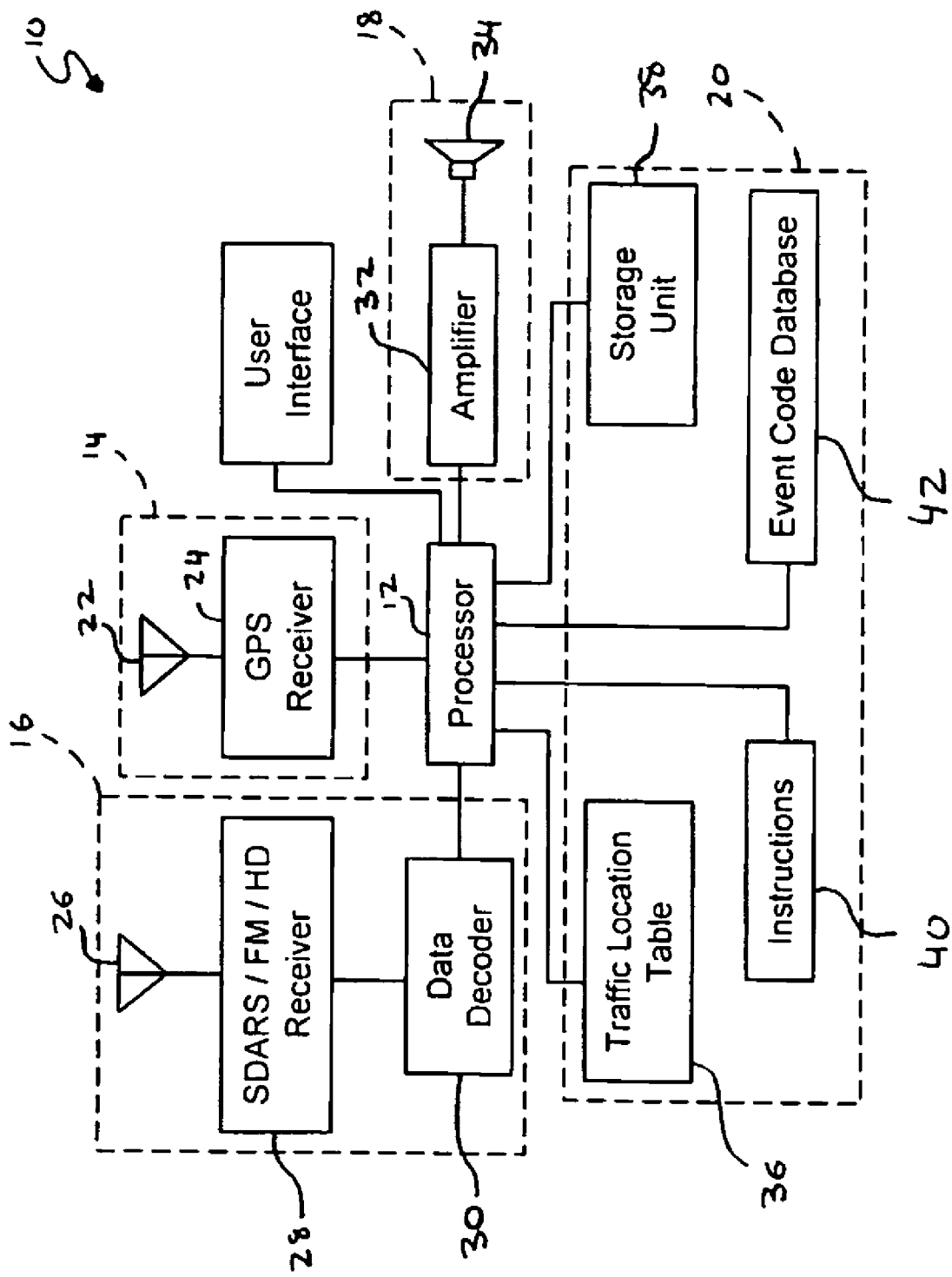
FIG. 1 is a block diagram of a system for providing a user with traffic information embodying the principles of the present invention.

Referring to FIG. 1, a system embodying the principles of the present invention is illustrated therein and designated at 10. As its primary components, the system 10 includes a processor 12 in communication with an automobile location system 14, a traffic messaging system 16, an output system 18, and a storage system 20. As it is well known in the art, the processor 12 may be a "system on a chip" integrating one of more of the automobile location system 14, traffic messaging system 16, output system 18, and storage system 20.

The automobile location system 14 is a global positioning system ("GPS") based system. The automobile location system 14 thus has a GPS antenna 22 capable of receiving GPS signals and communicating those signals to a GPS receiver 24. The received signals are generated by a plurality of GPS satellites and the automobile location system 14 is able to determine the position of the system 10, and therefore the automobile, by triangulating the received GPS signals. During operation of the system 10, the GPS receiver 24 may continually or intermittently provide the location of the system 10 to the processor 12.

The traffic messaging system 16 includes a traffic messaging antenna 26 in communication with a traffic receiver 28. Generally, the traffic messaging antenna 26 will receive signals containing automobile traffic data, such as location of traffic location data and traffic incident type. (Traffic incident type identifies the cause of the traffic, such as an accident, immobilized vehicle, and road construction.) These automobile traffic data signals may be generated as a sub-carrier from traditional AM and FM stations, generated from a High Definition (HD) Radio station, or may be generated from satellite digital audio radio services such as XM and Sirius. The traffic receiver 28 provides these incoming signals to a data decoder 30 that processes the received traffic signals and provides the traffic data to the processor 12. The data decoder 30 will generally arrange the data received from the traffic receiver 28 in a manner that the processor 12 can process and may, among other things, decrypt the data received from the traffic receiver 28. As will be appreciated by those skilled in the field of this technology, the data decoder 30 may be comprised of a combination of hardware and software where certain instructions may be executed by processor 12.

The output system 18 is generally an audio output system. Alternatively or additionally, output system 18 may include a display device. In the output system 18, any audio signals transmitted from the processor 12 are received by an amplifier 32. The amplifier 32 amplifies the audio signals, which detail traffic information relevant to the area of interest, and outputs the signal to the speaker 34, the output of which is heard by the occupant(s) of the automobile. The output system 18 may optionally be shared with other audio systems in the automobile, such as the AM/FM radio receiver or CD player. In this case, the audio signals transmitted from the processor 12 would temporarily interrupt and take precedence over the other optional audio sources and transmit the traffic information to the occupant(s) of the automobile. After transmission of the traffic information had been completed, the output system 18 could be utilized again by the optional audio sources. If the system 10 includes a display device, video or control signals from the processor 12 are displayed thereon for viewing by the occupant(s) of the automobile.

The storage device 20 includes a traffic location table 36, a storage unit 38, an instruction set 40, and an event code database 42. As will be appreciated by those skilled in the field of this technology, the storage system 20 may be a single storage device or may be multiple storage devices. Portions of storage system 20 may also be located on processor 12. Furthermore, the storage system 20 may be a solid state storage system, a magnetic storage system, an optical storage system or any other suitable storage system.

The traffic location table 36 contains a table having latitudinal and longitudinal coordinates corresponding to a variety of different road locations. As it is well known, map database and traffic location table manufacturers, such as the Navteq Corporation of Chicago, Ill., refer to road points using a customized numbering system. The traffic location table contains latitudinal and longitudinal coordinates corresponding to these road points. The instruction set 40, which may be embodied within any computer readable medium, includes processor executable instructions for configuring the processor to perform a variety of tasks, as will be later explained in connection with FIGS. 2, 3 and 4. The event code database 42 contains a description of the traffic event corresponding to the traffic event code. Finally, the storage unit 38 is a temporary storage unit that allows the processor 12 to temporarily store and retrieve data when required by the processor 12.

Figure 2:
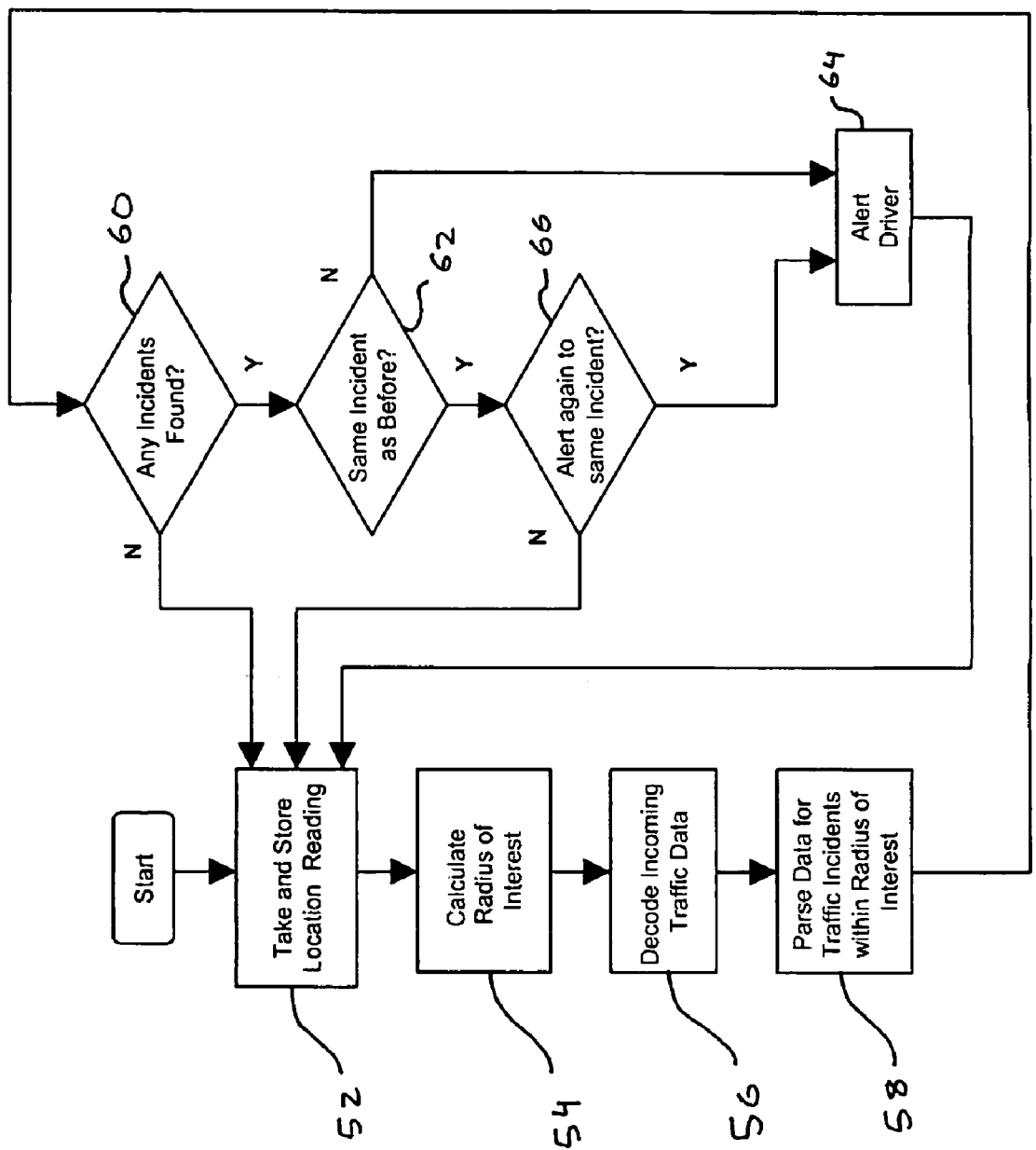
FIG. 2 is a flow chart of a method, embodying the principles of the present invention, for providing a user with traffic information based on a radius of location algorithm.

Referring to both FIGS. 1 and 2, a method 50 for providing traffic messaging information according to one aspect of the invention will now be described. The method 50 is embodied in the instruction set 40 that is executed by the processor 12. In step 52, the automobile location system 14 takes a location reading. This location reading is indicative of the location of the system 10 (and thus the automobile) and is stored within the storage unit 38. In step 54, the processor 12 calculates an area or radius of interest as determined from an input provided by the driver through a user interface 13, which corresponds to an area within a defined radius surrounding the location reading. This radius of interest will therefore include a plurality of latitudinal and longitudinal coordinates surrounding the location reading. The driver will have the ability to selecting from at least two different radius settings which will contain differing amounts of latitudinal and longitudinal coordinates.

In step 56, the traffic messaging system 16 receives and decodes incoming traffic data. Thereafter, in step 58, the processor 12 parses the incoming traffic data for any traffic congestions located within the area of interest. In order to accomplish this task, the processor 12 must convert the incoming traffic data to latitudinal and longitudinal coordinates. This is done by taking the incoming traffic data and looking up corresponding road segments in the traffic location table 36.

In step 60, the processor 12 determines if any traffic incident is located within the selected area of interest. If no traffic incident is located within the selected area of interest, the method 50 returns to step 52. Otherwise, as indicated by step 62, a determination is made if the traffic incident has not been discovered before. If the traffic incident is new and has not been identified in a prior cycle of the method, the driver is alerted via the output system 18, as shown in step 64. This can be accomplished by converting the traffic incident into audible speech using a text to speech engine. This alert includes traffic incident location data and may further include traffic incident type data.

If the same traffic incident was reported before, the processor 12 determines if the driver should be alerted again, as shown in step 66. The processor 12 makes this determination based on an input provided by the driver through the user interface 13. If the traffic incident was reported to the driver recently, the processor 12 will report the same incident again if requested by the driver. One method of accomplishing this would be by pushing a button on the user interface 13. Alternatively, the processor 12 can report a plurality of previously reported traffic incidents to the driver. If there is no request by the driver, the processor 12 will not report the traffic incident again to the driver, wherein the method 50 returns to step 52. Otherwise, the processor 12 will alert the driver again via the output system 18, as shown in step 64.

Figure 3:
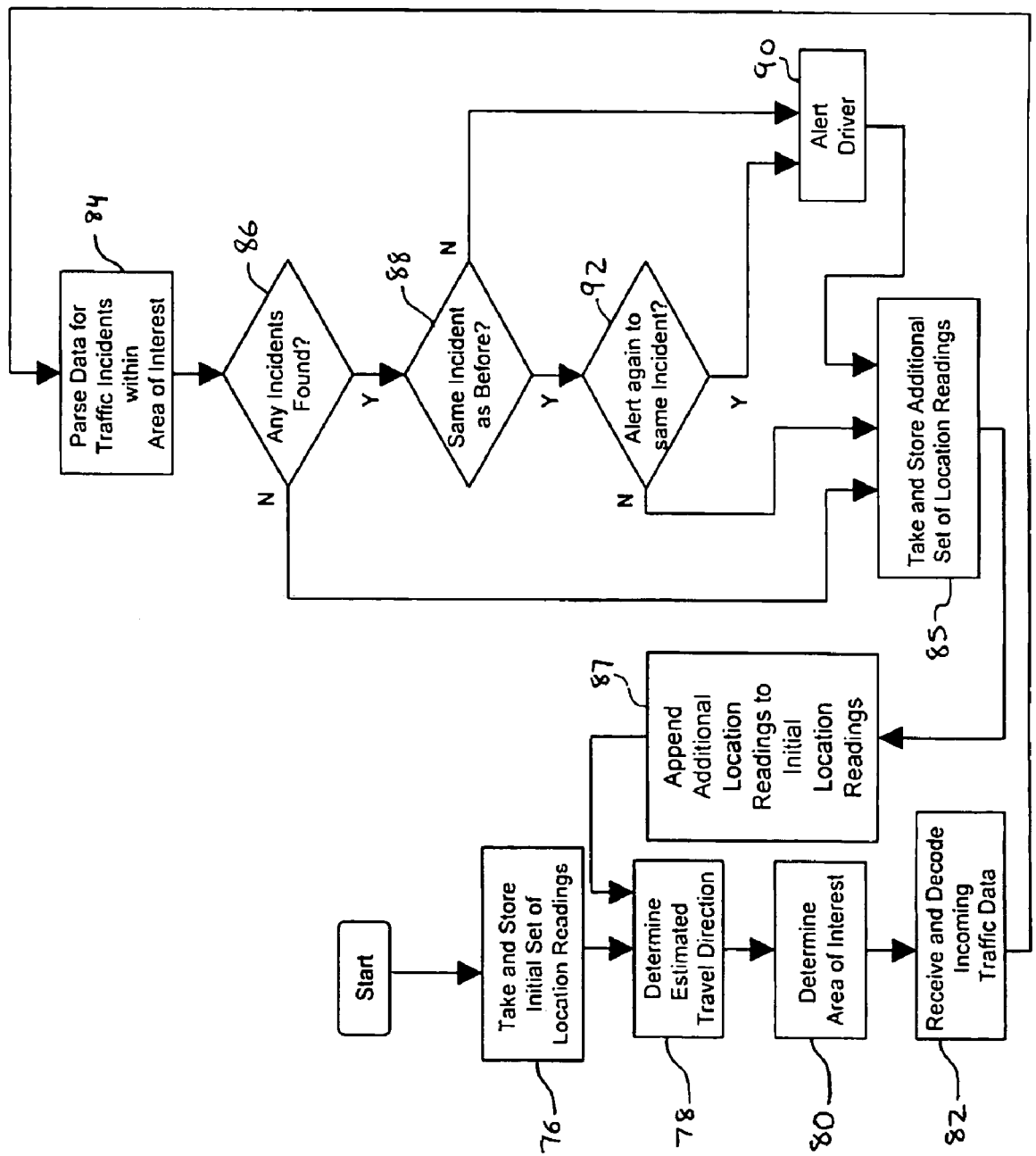
FIG. 3 is a flow chart of a method, for providing a user with traffic information based on a direction of travel algorithm, embodying the principles of the present invention.

Referring to FIGS. 1 and 3, another method 70 for providing traffic information to a driver is shown. In step 76, the automobile location system 14 takes and stores an initial set of location readings which are stored in the memory unit 38. The initial set of location readings are taken at periodic intervals with an associated wait state between each reading. The processor 12, in step 78, determines an estimated travel direction by comparing the latitudinal and longitudinal changes among the set of readings. Since step 76 allowed for a wait state between individual location readings, the automobile has been provided with some travel time and a general direction of the automobile can be determined.

In step 80, the processor 12 determines an area of interest. This area of interest includes a plurality of coordinates surrounding the travel direction by a predetermined angle and radius. The driver will have the ability to selecting from at least two different radius settings through the user interface 13 which will contain differing amounts of latitudinal and longitudinal coordinates. The specific radius can be absolute values, for example 10 miles, or it can be dynamically determined by processor 12 based on the speed of the automobile.

Similarly, the angular setting can be a predetermined fixed amount, or it can be dynamically determined by processor 12 based on the latitudinal and longitudinal changes occurring among the set of location readings.

Thereafter, in step 82, the traffic messaging system 16 receives and decodes incoming traffic data. The processor 12, in step 84, parses the data received from the traffic messaging system 16 for traffic incidents within the previously determined area of interest.

As shown in step 86, if no traffic incidents are found, the method 50 proceeds to step 85 where an additional set of location readings are taken at periodic intervals with an associated wait state between each reading. These readings are stored in the memory unit 38. Thereafter, in step 87, the additional location readings are appended to the initial set of location readings to provide a larger statistical set of location data which can be utilized by processor 12, in step 78, to more accurately determine an estimated travel direction By storing the additional location data, a new travel direction can be determined in the event the actual travel direction has changed. Otherwise, the system 10 determines if the same traffic incident was reported in a prior cycle of the method as shown in step 88.

If the same traffic incident was not reported before, the driver is alerted as indicated in step 90. Otherwise, the system 10 determines if the driver should be alerted again. This determination is similar to step 66 in FIG. 2. After step 92 and/or 90 have been executed, the system proceeds to previously described step 85.

Figure 4:
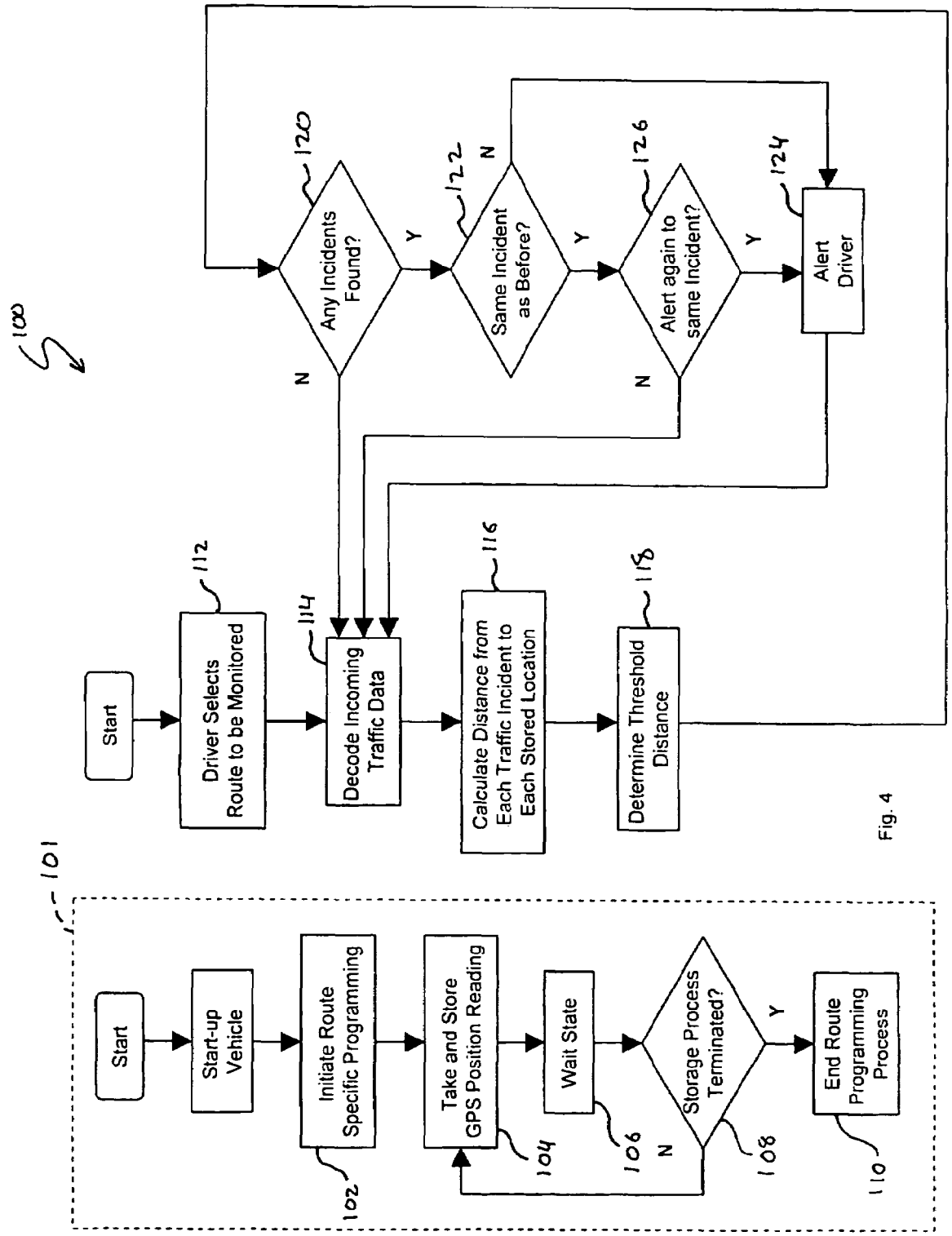
FIG. 4 is a flow chart of a method, embodying the principles of the present invention for providing a user with traffic information based on a route specific traffic alert algorithm.

Referring to FIGS. 1 and 4, an alternative method 100 for providing traffic information to a driver is shown. As a brief overview, methods 100 and 101 provide the driver with traffic information for traffic incidents along a commonly traveled route. To be more specific, the method 100 includes a subroutine 101 that records the commonly traveled route. The main method 100 provides the driver with traffic incident information along the commonly traveled route. As such, the subroutine 101 is performed prior to method 100. The method 100 may be performed immediately or any subsequent time after method 101.

In step 102 of the subroutine 101, the processor 12 initiates a specific route programming to record the commonly traveled route. This may be initiated by the driver or by the processor 12 itself. It should be understood that multiple common routes may be recorded and stored. For example, these multiple common routes may include routes to multiple work locations as well as often traveled entertainment locations.

In step 104, the processor 12 takes and stores from the automobile location system 14 a location reading. In step 106, the processor 12 waits. Thereafter, in step 108, it is determined if additional reading are required or if the storage process can be terminated, and if the storage process is to be terminated, the commonly traveled route programming process is terminated as shown in step 110. Otherwise, the method 101 returns to step 104 and continually stores the locations of the automobile. By storing a set of multiple location readings, the processor can define a specific route. The driver will have the ability to store at least two different sets of differing location readings, each of which will define a specific route.

In step 112, the driver selects a specific pre-recorded route on which to receive traffic information. The driver will have the ability to selecting from at least two different route settings through the user interface 13. The processor 12, in step 114, the processor 12 decodes the data received from the traffic messaging system 16 for traffic incidents in the geographic region containing the selected route. For example, processor 12 can decode all the traffic messages for the market which contains the selected route. The processor 12, in step 116, calculates the distance from each decoded traffic message in the geographic region containing the selected route to each stored location from step 104. In step 118, processor 12 retrieves a predetermined threshold distance which had been stored in storage unit 38 during the manufacturing process.

As shown in step 120, processor 12 compares the calculated distances from step 116 to the threshold distance in step 118. If any of the calculated distances from step 116 are equal to or less than the threshold distance in step 118, processor 12 will alert the driver than traffic incidents have been found along the selected route. If no traffic congestions are found, the method returns to step 114.

In step 122, a determination is made if the same traffic congestion was reported before. If the same traffic congestion was not reported before, the driver is alerted as indicated in step 124. Otherwise, the system 10 determines if the driver should be alerted again, as shown in step 126. This determination is similar to step 66 in FIG. 2. After step 124 and/or 126 have been executed, the system proceeds to previously described step 114.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A system for providing a user with traffic information, the system comprising:
   a processor;
   a traffic antenna in communication with the processor, the traffic antenna configured to transmit a traffic message to the processor, the traffic message having a traffic location and a traffic incident;
   a location antenna in communication with the processor, the location antenna configured to transmit location data to the processor, the location data being latitudinal and longitudinal location data;
   an output device in communication with the processor;
   a traffic location table database in communication with the processor, the traffic location table database having latitudinal and longitudinal location codes and a description of the corresponding to the traffic location;
   an event code database in communication with the processor, the event code database having a description of the traffic event corresponding to the traffic event code;
   a memory unit in communication with the processor and having processor executable instructions for configuring the processor to determine at least one radius of interest, at least one radius of interest comprising a plurality of latitudinal and longitudinal coordinates, to receive the traffic message, to convert the traffic location code of the traffic message to a latitudinal and longitudinal traffic location, and to output the traffic message to an output device if the traffic location is located within the at least one radius of interest.

2. The system of claim 1, wherein the output device is an audio output device.

3. The system of claim 1, wherein the traffic antenna is a global positioning antenna.

4. The system of claim 1, wherein the memory unit includes processor executable instructions for configuring the processor to receive set of location readings taken at periodic intervals from the location antenna, to determine a travel direction by comparing the latitudinal and longitudinal changes among the set of readings and to define the at least one radius of interest as a plurality of latitudinal and longitudinal coordinates surrounding the travel direction.

5. The system of claim 1, wherein the memory unit includes processor executable instructions for configuring the processor to receive a plurality of locations from the location antenna, to determine a travel route by storing and comparing the plurality of locations selected by a user, and to define the at least one radius of interest as a plurality of latitudinal and longitudinal coordinates surrounding the travel route.

6. The system of claim 1, wherein the memory unit includes processor executable instructions for configuring the processor to determine if the traffic message has been previously outputted to the output device, and to output the traffic message to the output device if the traffic event has not been previously outputted to the output device.

7. The system of claim 6, wherein the memory unit includes processor executable instructions for configuring the processor to output a previously outputted traffic message to the output device as determined by a user.

8. A method for providing a user with traffic information, the method comprising:
   determining at least one radius of interest, the area of interest including a plurality of latitudinal and longitudinal coordinates;
   receiving a traffic message, the traffic message having a traffic location and a traffic incident;
   converting the traffic location of the traffic message to a latitudinal and longitudinal traffic location; and
   outputting the traffic message to an output device if the latitudinal and longitudinal traffic location is located within the at least one radius of interest.

9. The method of claim 8, further comprising the steps of:
   converting the traffic message to an audio traffic event; and
   outputting the audio traffic message to the output device.

10. The method of claim 8, wherein the step of determining at least one radius of interest further comprises the steps of:
    receiving a set of location readings taken at periodic intervals;
    determining a travel direction by comparing the latitudinal and longitudinal changes among the set of readings first; and
    defining the at least one radius of interest as a plurality of latitudinal and longitudinal coordinates surrounding the travel direction.

11. The method of claim 8, wherein the step of determining at least one radius of interest further comprises the steps of:
    receiving a plurality of locations of the user;
    determining a travel route by comparing the plurality of locations of the user; and
    defining the at least one radius of interest as a plurality of latitudinal and longitudinal coordinates surrounding the travel route.

12. The method of claim 8, further comprising the steps of:
    determining if the traffic message has been previously outputted to the output device; and
    outputting the traffic message to the output device if the traffic event has not been previously outputted to the output device.

13. The method of claim 12, further comprising the step of outputting the traffic message to the output device as determined by a user.

14. In a computer readable storage medium having stored therein data representing instructions executable by a programmed processor for enabling operation of a system for providing a user with traffic information, the storage medium comprising instructions for:
    determining at least one radius of interest, the area of interest being a plurality of latitudinal and longitudinal coordinates;
    receiving a traffic message, the traffic message having a traffic location and a traffic incident;
    converting the traffic location of the traffic message to a latitudinal and longitudinal traffic location; and
    outputting the traffic message to an output device if the latitudinal and longitudinal traffic location is located within the at least one radius of interest.

15. The instructions of claim 14, further comprising instructions for:
    converting the traffic message to an audio traffic event; and
    outputting the audio traffic message to the output device.

16. The instructions of claim 14, wherein the instruction for determining at least one radius of interest further comprises instructions for:
    receiving a set of location readings taken at periodic intervals;
    determining a travel direction by comparing the latitudinal and longitudinal changes among the set of readings; and
    defining the at least one radius of interest as a plurality of latitudinal and longitudinal coordinates surrounding the travel direction.

17. The instructions of claim 14, wherein the instruction for determining at least one radius of interest further comprises instructions for:
    receiving a plurality of locations of the user;
    determining a travel route by comparing the plurality of locations of the user; and
    defining the at least one radius of interest as a plurality of latitudinal and longitudinal coordinates surrounding the travel route.

18. The instructions of claim 14, further comprising instructions for:
    determining if the traffic message has been previously outputted to the output device; and
    outputting the traffic message to the output device as determined by the user.

19. The instructions of claim 18, further comprising instructions for outputting the traffic message to the output device if the traffic event has not been outputted to the output device for a specified time.

* * * * *

UNITED STATES PATENT AND TRADEMARK OFFICE
CERTIFICATE OF CORRECTION

| | | |
|---|---|---|
| PATENT NO. | : 7,617,045 B2 | Page 1 of 1 |
| APPLICATION NO. | : 11/580168 | |
| DATED | : November 10, 2009 | |
| INVENTOR(S) | : Richard D. Zerod et al. | |

It is certified that error appears in the above-identified patent and that said Letters Patent is hereby corrected as shown below:

In the Claims

In column 8, claim 14, line 15, after "one radius of interest, the" replace "area" with --radius--.

Signed and Sealed this

Ninth Day of November, 2010

David J. Kappos
*Director of the United States Patent and Trademark Office*